United States Patent Office 3,047,592
Patented July 31, 1962

3,047,592
NEW 6-METHYL-19-NOR-TESTERONE DERIVATIVES AND PROCESS FOR THE PREPARATION THEREOF
Karl Heinz Schönemann, Nijmegen, and Hendrik Paul de Jongh, Oss, Netherlands, assignors to Organon Inc., West Orange, N.J., a corporation of New Jersey
No Drawing. Filed Sept. 14, 1959, Ser. No. 839,584
Claims priority, application Netherlands Sept. 20, 1958
2 Claims. (Cl. 260—397.4)

This invention relates to new 6-methyl steroids and to a process for the preparation thereof.

More particularly this invention relates to new 6-methyl-steroids of the general formula:

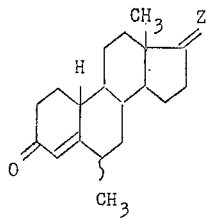

in which Z is selected from the group consisting of H($\beta$OH), H($\beta$OAcyl), R($\beta$OH), R($\beta$OAcyl) and =O, in which R is selected from the group consisting of a saturated or unsaturated aliphatic hydrocarbon radical containing 1–4 carbon atoms.

The novel compounds exert a strong anabolic activity and also have progestative properties.

The process according to the invention also leads to new valuable intermediates of the general formula:

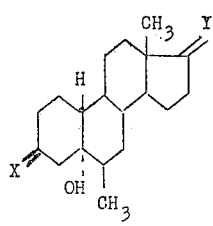

in which X is selected from the group consisting of H($\beta$OH) and =O, and Y is selected from the group consisting of H($\beta$OH), H($\beta$OAcyl), R($\beta$OH), R($\beta$OAcyl) and =O, in which R is selected from the group consisting of a saturated or unsaturated aliphatic hydrocarbon radical containing 1–4 carbon atoms.

The compounds according to the invention can be prepared in the usual manner for analogous compounds.

A preferred method for the preparation of the present compounds consists in that start is made from a 3-mono or 3,17-diacylate of $\Delta^5$-3,17-dihydroxy-19-nor androstene, converting this compound into the corresponding $5\alpha,6\alpha$-oxido compound in a known manner, converting the latter by means of a methyl metal compound, preferably a methyl magnesium halogenide, into the $3\beta,5\alpha,17\beta$-trihydroxy-6-methyl-19-nor-androstane, oxidizing the latter in a known manner to the corresponding 3,17-diketo compound, treating the latter with a dehydrating agent, converting the thus obtained $\Delta^4$-3-keto compound into the corresponding 3-enol ether or 3-enamine, then reducing the 17-keto group according to a manner known per se, preferably by means of an alkali metal borohydride or an alkali metal aluminum hydride, to a 17-hydroxyl group, subsequently splitting off the 3-enol ether group or the 3-enamine group by means of an acid, and finally converting, if desired, the thus obtained compound into the corresponding 17-ester.

The preparation of the desired $5\alpha,6\alpha$-oxido compound from the corresponding $\Delta^5$-nor-androstene compound can be carried out according to a method known per se, for example by means of an organic per-acid or with hydrogen peroxide. This reaction is preferably carried out with an organic peracid, if necessary in the presence of an organic solvent. As peracids may be applied for example perbenzoic acid, peracetic acid, performic acid or monoperphthalic acid. As solvents may be used for example ethyl acetate, an aromatic hydrocarbon, such as benzene, or a halogenated hydrocarbon, such as chloroform, carbon tetrachloride or methylene dichloride.

Then the thus obtained $5\alpha,6\alpha$-oxido compound is converted into the corresponding $5\alpha$-hydroxy-6-methyl compound by means of a methyl metal compound. As methyl metal compound is preferably applied a methyl metal halogenide, especially a methyl magnesium halogenide, such as methyl magnesium bromide. At the same time the ester groupings present in the 3 and 17 positions are split off in this reaction.

Then in a known manner the resulting $3\beta,5\alpha,17\beta$-trihydroxy-6-methyl-19-nor-androstane is oxidized to the corresponding 3,17-diketo compound.

This oxidation can be carried out for example according to the Oppenauer method or with chromium trioxide.

Then the thus obtained 3,17-diketo-$5\alpha$-hydroxy-6-methyl-19-nor-androstane compound is dehydrated, in which the 5-hydroxyl group is split off and a double bond between the carbon atoms 4 and 5 is formed. The dehydration can take place by treating the $5\alpha$-hydroxy compound with an organic acid, for example formic acid or para toluene sulphonic acid, an inorganic acid, for example hydrochloric acid or sulphuric acid, or for example by treatment with phosphoroxychloride or thionylchloride in the presence of pyridine. Preferably an alcoholic solution of hydrochloric acid is applied, for example an ethanolic or methanolic hydrochloric acid solution.

Before the reduction of the 17-keto group is carried out, it is necessary to protect the $\Delta^4$-3-keto grouping present. This can take place by converting the resulting $\Delta^4$-3-keto compound in a known manner into the corresponding 3-enol ether or 3-enamine.

The subsequent reduction of the 17-keto group can take place with one of the commonly used reduction agents. Preferably an alkali metal borohydride or alkali metal aluminium hydride is applied for this purpose.

After splitting off of the 3-enol ether group or the 3-enamine group by means of an organic or inorganic acid the desired $\Delta^4$-3-keto-6-methyl-17$\beta$-hydroxy-19-nor-androstene is obtained.

The process described above can also be applied to a 3-mono-or 3,17-diacylate of a $\Delta^5$-3,17-dihydroxy-17$\alpha$-alkyl-19-nor-androstene compound. In the oxidation of the 3-hydroxyl group the 17-hydroxy-17$\alpha$-alkyl-group remains intact, however, so that the protection of the $\Delta^4$-3-keto grouping mentioned above, reduction of the 17-keto group and splitting off of the 3-enol ether group or the 3-enamine group can be omitted.

The in 17-position alkylated $\Delta^4$-3-keto-6-methyl-19-nor-steroids can also be prepared by converting $\Delta^4$-3,17-diketo-6-methyl-19-nor-androstene, prepared by the first of the pre-described methods, of which the 3-keto group is temporarily protected by a, for example, enol ester or enol ether grouping in a manner known per se in a corresponding 17-hydroxy-17-alkyl compound. The protected group present in 3-position is afterwards split off by means of a treatment with an acid.

This alkylation in 17-position can be performed for example by addition at the 17-keto group of the mentioned steroid a metal derivative of a saturated or unsaturated hydrocarbon. The metal derivative may be a magnesium halogenide, for example the magnesium bromide of the relating hydrocarbon.

The preparation of the 17-hydroxy-17-alkynyl compounds can also take place by means of an addition reaction between the 17-keto steroid and a hydrocarbon having a triple-bond in the presence of an alkali metal or an alkali metal compound as in an alkali metal amide or an alkali metal alcoholate or by means of the addition of a metal compound of a hydrocarbon having a triple-bond to the 17-keto group of the starting product. This metal compound may be an alkali metal or alkaline earth metal compound.

The 17-hydroxy-17-alkenyl compounds can also be prepared by reduction of the corresponding 17-alkynyl compound for example by means of hydrogen in the presence of a catalyst such as nickel.

Any saturated hydrocarbon residue in 17-position that may be present in the final products is for example a methyl, ethyl, propyl, isopropyl or butyl radical. The unsaturated hydrocarbon residue may be a vinyl, propenyl, allyl, methallyl, ethynyl, propynyl or butynyl radical.

The thus obtained $\Delta^4$-3-keto-6-methyl-17$\beta$-hydroxy-, and $\Delta^4$-3-keto-6-methyl - 17$\beta$ - hydroxy-17$\alpha$-alkyl-19-nor-androstene compounds can be esterified at the 17-hydroxyl group if desired.

Preferably an acid with 1 to 30 carbon atoms is used for the esterification.

As examples for acids to be used are mentioned: formic acid, acetic acid, propionic acid, butyric acid, valeric acid, capronic acid, caprylic acid, capric acid, undecylic acid, lauric acid, tridecyilc acid, myristic acid, pentadecylic acid, oleic acid, palmitic acid, stearic acid, arachidic acid, behenic acid, lignoceric acid, cerotic acid, trimethyl acetic acid, diethyl acetic acid, hexahydrobenzoic acid, cyclopentylpropionic acid, cyclohexylpropionic acid, cyclohexyl butyric acid, citronellic acid, undecylenic acid, benzoic acid, phenyl acetic acid, phenylpropionic acid, phenylbutyric acid, phenylpropiolic acid, succinic acid, glutaric acid, pimelic acid, tartaric acid, carbamic acid, glycine and alanine.

These esters can be prepared according to a method known per se preferably by reacting a 6-methyl-17$\beta$-hydroxy-19-nor-testosterone with trifluoro acetic acid anhydride. The reaction may also be performed with an acid in the presence of a dehydrating agent such as ethoxy acetylene or N,N'-dicyclohexylcarbodiimide.

The esterification may also be performed by reacting the starting product with an acid anhydride eventually in the presence of a tertiary base, such as pyridine and of a suitable solvent such as ether, dioxane or benzene. It is also possible to prepare the desired esters by means of an acid halogenide preferably the acid chloride. In that case the reaction is preferably performed in the presence of a tertiary base such as pyridine or quinoline in order to bind the halogen hydrogen acid that has formed during the reaction. In this reaction, too, use can be made of a suitable solvent such as ether, dioxane or benzene.

The $\Delta^5$-3,17-diacyloxy-19-nor-androstene to be applied as starting product is known from J. Am. Chem. Soc. 78, 5662 (1956).

The $\Delta^5$-3-17-dihydroxy-17$\alpha$-alkyl - 19 - nor-androstene compounds or esters thereof to be applied as starting products can be prepared by converting 17$\alpha$-alkyl-19-nor-testosterone into a 3-enolacylate and reducing the double bond between the carbon atoms 3 and 4.

The following examples illustrate the invention.

*Example I*

To a solution of 12.3 g. of $\Delta^5$-3$\beta$,17$\beta$-diacetoxy-19-nor-androstene in 100 ml. of ethyl acetate is added a solution of 0.068 mol monoperphthalic acid in ethyl acetate. The reaction mixture is left to stand at room temperature for 18 hours and the excess of monoperphthalic acid is removed by shaking out with a 5% sodium hydroxide solution. Then the ethyl acetate solution is washed with water till neutral, dried on sodium sulphate and evaporated to dryness in vacuo. The residue is recrystallized from a mixture of petroleum ether and ether, after which the 3$\beta$, 17$\beta$-diacetoxy-5$\alpha$,6$\alpha$-oxido-19-nor-androstane of melting point 144–145° C. is obtained in a yield of 77%.

4.7 g. of this compound are dissolved in 400 ml. of absolute benzene. While stirring vigorously 190 ml. of an ethereal methyl magnesium bromide solution and 190 ml. of absolute benzene are added to this solution. Then the ether is distilled off, after which the mixture is refluxed for 3 hours after the addition of 50 ml. of benzene. Then, while cooling in ice, the mixture is decomposed with 15% sulphuric acid. The resulting precipitate is sucked off, washed with ether, then with water, and finally dried yielding 3.80 g. of 3$\beta$,5$\alpha$,17$\beta$-trihydroxy-6-methyl-19 - nor-androstane of melting-point 198–199° C.

3.14 g. of this compound are dissolved in 50 ml. of glacial acetic acid, after which a solution of 4.3 g. of chromium trioxide in 4.3 ml. of water and 30 ml. of glacial acetic acid are added while cooling. The mixture is left to stand at +4° C. for 15 hours, 16 ml. of methanol are added after which it is diluted with water.

The mixture is then extracted with benzenes, the benzene layer is separated, washed with water, then with a 5% sodium bicarbonate solution in water, and finally with water till neutral.

Then the mixture is evaporated to dryness in vacuo, after which the residue is stirred with ether, after which 2.6 g. of the 3,17-diketo-5$\alpha$-hydroxy-6-methyl-19-nor-androstane of melting-point 207–208.5° C. are obtained.

1.0 g. of this compound is dissolved in 15 ml. of absolute ethanol, after which 0.1 ml. of concentrated hydrochloric acid is added. The mixture is refluxed for 5 minutes, then cooled and poured into 100 ml. of ice-water. The formed crystallisate is sucked off, washed with water till neutral and recrystallized from ether, after which the $\Delta^4$-3,17-diketo-6-methyl-19-nor-androstene of melting point 138–139° C. is obtained in a nearly quantitative yield.

0.5 g. of this compound is dissolved in 3 ml. of dioxane, after which 0.6 ml. of ethylorthoformate and a solution of 6 mg. of p-toluene sulphonic acid in 0.6 ml. of dioxane and 0.2 ml. of absolute ethanol are added. The mixture is shaken for one hour, 0.2 ml. of pyridine is added and then it is evaporated to dryness in vacuo. The residue is recrystallized from absolute ethanol, after which the corresponding 3-enol ether of melting-point 110–113° C. is obtained.

0.5 g. of this compound is dissolved in 25 ml. of 96% ethanol, after which, while stirring, a solution of 1 g. of sodium borohydride in 25 ml. of 70% ethanol is added. The reaction mixture is stirred for 2 hours, then acidified with hydrochloric acid, and finally evaporated to dryness in vacuo. The residue is recrystallized from a mixture of ether and petroleum ether, yeilding the 6-methyl-19-nor-testosterone in a yield of 89%. Melting-point 172–173° C.

The infrared spectre (taken in bromoform) shows maxima at 2.77$\mu$ (17-OH); 6.02$\mu$ (3-keto); 6.18$\mu$ ($\Delta^4$-); 7.25$\mu$ (CH$_3$-); 9.49$\mu$ (17-OH) and 11.31$\mu$ ($\Delta^4$-3-keto).

*Example II*

4.0 g. of acetic anhydride are added to a solution of 2.1 g. of 6-methyl-19-nor-testosterone in 11 ml. of pyridine. The solution is kept at room temperature overnight, after which 15 ml. of water are added. Then the mixture is stirred for 2 hours and subsequently, after the addition of 100 ml. of water, extracted with ether. The ether extract is washed with 2 N hydrochloric acid, then with 1 N sodium hydroxide, subsequently dried on sodium sulphate, and finally evaporated to dryness. The residue is recrystallized from methanol, after which the 17-acetate of 6-methyl-19-nor-testosterone is obtained.

In an analogous manner also other 17-esters hereof can be prepared viz. the propionate, valerianate, isocapronate, and the caprylate by replacing the above applied acetic anhydride by an equivalent quantity of respectively propionic anhydride, valeric anhydride, isocapronic anhydride, and caprylic anhydride.

*Example III*

2 ml. of caprinyl chloride are added to a solution of 1.0 g. of 6-methyl-19-nor-testosterone in 9 ml. of pyridine while stirring. Then the reaction mixture is left overnight at room temperature, 20 ml. of water are then added and the solution is stirred for 2 hours. Then the mixture is processed as described in Example II. The resulting residue is taken up in benzene petroleum ether (1:1) and then filtered over 40 g. of aluminium oxide. The eluate is evaporated to dryness and the drying residue is recrystallized from methanol. Obtained is the 17-caprinate (-decanoate) of the 6-methyl-19-nor-testosterone.

In an analogous manner the 17-hexahydro benzoate, the 17-undecylate, the 17-laurate, the 17-myristinate, the 17-pentadecylate, the 17-palmitate and the 17-cerotinate of the 6-methyl-19-nortestosterone can be prepared.

*Example IV*

To a solution of 1.6 g. of 6-methyl-19-nor-testosterone in 11 ml. of pyridine are added 7 g. of β-phenyl propionic anhydride. Then the reaction mixture is treated as described in Example II, as a result of which the 17β-phenyl propionate of 6-methyl-19-nor-testosterone is obtained. Melting-point 102.5–103.5° C.

In an analogous manner also the trimethyl acetate, cyclopentyl propionate, γ-cyclohexyl butyrate, and the succinate of 6-methyl-19-nor-testosterone can be prepared.

*Example V*

At 0° C. 2.0 g. of undecylenic chloride are added dropwise to a solution of 2.8 g. of 6-methyl-19-nor-testosterone in 7 ml. of pyridine. The mixture is maintained at room temperature for 12 hours and then heated on a steam bath for 30 minutes. Then the mixture is cooled, poured into 50 ml. of ice water, and then extracted with ether. The ether extract is further treated as described in Example II, after which the 17-undecylenate of 6-methyl-19-nor-testosterone is obtained.

In an analogous manner also the benzoate and the phenyl acetate of the 6-methyl-19-nor-testosterone can be obtained.

*Example VI*

To a solution of allyl magnesium bromide prepared by the addition of a mixture of 8.0 g. of magnesium and 150 ml. of ether to a solution of 12 ml. of allyl bromide in 12 ml. of ether a solution of 2.72 g. of 3-enol ethyl ether of Δ⁴-3,17-diketo-6-methyl-19-nor-androstene is added at 0° C. in nitrogen atmosphere in 170 ml. of ether. The reaction mixture is afterwards stirred 5 hours at 0° C. and is afterwards kept one night at room temperature. The formed Grignard compound is subsequently decomposed at 0° C. with 10% sulphuric acid, the ether layer is separated, washed with water, dried on sodium sulphate and afterwards evaporated in vacuo.

The thus obtained oil is chromatographed over 140 g. of silica gel when the elution is performed with a mixture of benzene and ether (4:1).

After evaporation of the solvent the 6-methyl-17α-allyl-19-nor-testosterone is obtained; $\lambda_{max}$=241 mμ; ε=14,000.

To a solution of 2.3 g. 6-methyl-17α-allyl-19-nor-testosterone in 15 ml. of pyridine 4.1 g. of acetic acid anhydride are added. The solution is stirred 8 hours at 35° C. after which 20 ml. of water are added to it. The mixture is subsequently stirred 2 hours and subsequently extracted with ether after adding 100 ml. of water. The ether extract is washed with 2 N hydrochloric acid, afterwards with 1 N sodium hydroxide, subsequently dried on sodium sulphate and finally evaporated to dryness. The residue is recrystallized from methanol after which the 17-acetate of the 6-methyl-17α-allyl-19-nor-testosterone is obtained.

In an anologous manner the valerianate, trimethyl acetate, caprylate, and β-phenylpropionate are prepared to replace the afore-used acetic acid anhydride by means of an equivalent amount of the said acid anhydride.

*Example VII*

To a solution of 4.2 g. of Δ⁵-3β,17β-dihydroxy-17α-methyl-19-nor-androstene (melting-point 192–193° C.) in 25 ml. of pyridine 16.0 g. of acetic acid anhydride are added. The reaction mixture is afterwards treated as in Example I for the preparation of the 17-acetate. Obtained in the 3,17-di-acetate of Δ⁵-3β,17β-dihydroxy-17α-methyl-19-nor-androstene.

To a solution of 3.1 g. of this compound in 25 ml. of ethyl acetate a solution of 0.018 mol monoperphthalic acid in ethyl acetate is added. The reaction mixture is left 18 hours at room temperature and the excess of monoperphthalic acid is removed by shaking out with a 5% sodium hydroxide solution. The solution of ethyl acetate is afterwards washed with water till neutral, dried on sodium sulphate and evaporated in vacuo to dryness. The residue is recrystallised from a mixture of petroleum ether and ether after which the 3β,17β-di-acetoxy - 5α,6α - oxido - 17α - methyl - 19 - nor -androstane is obtained.

2.5 g. of this compound are dissolved in 200 ml. of absolute benzene. Added to this solution while vigorously stirring 100 ml. of an etheric methyl magnesium bromide solution and 90 ml. of absolute benzene. The ether is subsequently distilled off, after which the mixture, after addition of 35 ml. of benzene, is refluxed for 3 hours. The mixture is subsequently decomposed with 15% of sulphuric acid while cooling in ice. The formed precipitate is sucked off, washed with ether, after that with water and finally dried when the 3β,5α,17β-trihydroxy-6-methyl-17α-methyl-19-nor-androstane is obtained.

To a solution of 2 g. of this compound in 35 ml. of acetic acid a solution of 2.8 g. of chromic trioxide in 2.8 ml. of water and 20 ml. of glacial acetic acid is added at 0° C., the mixture is left to stand 14 hours at +4° C., next 15 ml. of methanol are added and next the whole is diluted with water. The mixture is subsequently extracted with benzene, the benzene layer is separated, washed with water, subsequently with a 5% solution of sodium bicarbonate in water and finally to neutral with water. The mixture is subsequently evaporated till dry in vacuo after which the residue is stirred with ether, after the 3-keto-5α-17β-dihydroxy-6-methyl-17α-methyl-19-nor-androstane is obtained.

To a solution of 2 g. of this compound in 30 ml. of absolute ethanol 0.2 ml. of concentrated hydrochloric acid is added. The mixture is refluxed for 5 minutes, subsequently cooled and poured out in 200 ml. of ice-water. The formed crystallisate is sucked off, washed with water to neutral and recrystallized from ether, after which the Δ⁴ - 3 - keto - 6 - methyl - 17β - hydroxy - 17α - methyl-19-nor-androstene is obtained.

To a solution of 1.6 g. of this compound in 5 ml. of pyridine 1.15 g. of undecylenic acid chloride are added dropwise at 0° C. The mixture is kept at room temperature 12 hours and after which heated on a steam bath for 30 minutes. The mixture is subsequently cooled, poured out in 35 ml. of ice-water and extracted with ether. The ether extract is further treated as described in Example I after which the 17-undecylenate of 6-methyl-17α-methyl-19-nor-testosterone is obtained.

The hexahydrobenzoate, laurate, and pentadecylate can be prepared in an analogous manner.

According to the process described before are prepared respectively the 6-methyl-17α-ethyl-19-nor-testosterone, the 6-methyl-17α-propyl-19-nor-testosterone and the 6- methyl - 17α - vinyl - 19 - nor -testosterone based on Δ⁵-3β,17β - dihydroxy - 17α - ethyl - 19 - nor - androstene, Δ⁵ - 3β,17β - dihydroxy - 17α - propyl - 19 - nor - androstene and the Δ⁵-3β,17β-dihydroxy-17α-vinyl-19-nor-androstene.

These compounds are converted in a known manner into the corresponding 17-acylates derived from saturated or unsaturated carboxylic acids with 1–30 carbon atoms.

*Example VIII*

While leading in nitrogen 7.5 g. of sodium are dissolved in 42 ml. of isopropyl alcohol and 93 ml. of benzene. Next acetylene gas is led in for 6 hours followed by the addition of a solution of 15 g. of 3-enol ether in 66 ml. of benzene and 39 ml. of ether. After leading in again acetylene gas for 4 hours the whole is decomposed with 85 ml. of diluted sulfuric acid (1:8). After adding 150 ml. of water extraction takes place with benzene. The solution in benzene is washed until neutral, dried on sodium sulphate and evaporated to dryness. The residue is dissolved in 40 ml. of alcohol and refluxed with 2½ ml. of 1 N hydrochloric acid for 15 minutes. After dilution with water, extraction with benzene and evaporation to dryness of the neutral solution in benzene 15 g. of crude 17-ethynyl-6-methyl-nor-testosterone are obtained. Recrystallisation from acetone-ether gives the pure product. Melting-point is 163–164° C.

This compound is converted in a known manner into esters, derived from saturated and unsaturated carboxylic acids with 1–30 carbon atoms.

According to the process described in Example VI the 3-enol ether of the Δ⁴-3,17-diketo-6-methyl-19-nor-androstene is converted into the 6-methyl-17α-butynyl-19-nor-testosterone.

*Example IX*

In 100 ml. of dioxane 0.36 g. of palladium-norit (5%) is prehydrated. A solution of 2.1 g. of 17-ethynyl-6-methyl-nor-testosterone in 150 ml. of dioxane is added and hydration takes place till the theoretical quantity of hydrogen is taken up.

After chromatography over neutral aluminum oxide and recrystallisation from ethanol-ether pure 17-ethyl-6-methyl-nor-testosterone is obtained. Melting-point is 141–142° C.

We claim:
1. Steroids of the general formula:

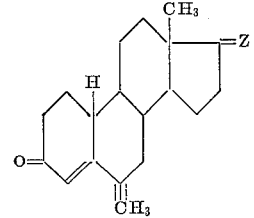

in which
Z is selected from the group consisting of R(βOH), R(βOAcyl) and =O, in which R is selected from the group consisting of an alkynyl radical containing 2–4 carbon atoms.

2. Steroids of the general formula:

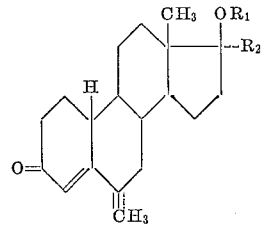

in which
$R_1$ is selected from the group consisting of hydrogen and an acyl radical, and
$R_2$ is an alkynyl radical containing 2–4 carbon atoms.

References Cited in the file of this patent
UNITED STATES PATENTS

| | | |
|---|---|---|
| 2,838,530 | Colton | June 10, 1958 |
| 2,891,078 | Colton et al. | June 16, 1959 |
| 2,939,819 | Barton et al. | June 7, 1960 |

OTHER REFERENCES

Villotte et al.: "Journ. Amer. Chem. Soc.," vol. 81, Sept. 5, 1959, pages 4566–4578.

UNITED STATES PATENT OFFICE
CERTIFICATE OF CORRECTION

Patent No. 3,047,592                                      July 31, 1962

Karl Heinz Schönemann et al.

It is hereby certified that error appears in the above numbered patent requiring correction and that the said Letters Patent should read as corrected below.

Column 1, line 72, for "$\Delta^5$-nor-androstene" read -- $\Delta^5$-19-nor-androstene --.

Signed and sealed this 13th day of November 1962.

(SEAL)
Attest:

ERNEST W. SWIDER                                   DAVID L. LADD
Attesting Officer                                     Commissioner of Patents